US009886796B2

(12) United States Patent
Kobayashi

(10) Patent No.: US 9,886,796 B2
(45) Date of Patent: Feb. 6, 2018

(54) DISPLAY DEVICE, HEAD MOUNTED DISPLAY, DISPLAY SYSTEM, AND CONTROL METHOD FOR DISPLAY DEVICE

(71) Applicant: SEIKO EPSON CORPORATION, Tokyo (JP)

(72) Inventor: Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 50 days.

(21) Appl. No.: 14/905,306

(22) PCT Filed: Aug. 1, 2014

(86) PCT No.: PCT/JP2014/004050
§ 371 (c)(1),
(2) Date: Jan. 15, 2016

(87) PCT Pub. No.: WO2015/015811
PCT Pub. Date: Feb. 5, 2015

(65) Prior Publication Data
US 2016/0163109 A1 Jun. 9, 2016

(30) Foreign Application Priority Data

Aug. 2, 2013 (JP) .................................. 2013-161080

(51) Int. Cl.
*G06T 19/00* (2011.01)
*G06F 3/01* (2006.01)
(Continued)

(52) U.S. Cl.
CPC ........ *G06T 19/006* (2013.01); *G02B 27/0172* (2013.01); *G06F 3/011* (2013.01);
(Continued)

(58) Field of Classification Search
CPC ........... H04N 13/0022; H04N 13/0018; H04N 13/0475; H04N 13/0278; H04N 13/0484;
(Continued)

(56) References Cited

U.S. PATENT DOCUMENTS 5,745,109 A 4/1998 Nakano et al.
6,002,403 A 12/1999 Sugiyama et al.
(Continued)

FOREIGN PATENT DOCUMENTS

EP 2530510 A2 12/2012
JP H05-328258 A 12/1993
(Continued)

OTHER PUBLICATIONS

Dec. 1, 2014 Search Report issued in International Patent Application No. PCT/JP2014/004050.
(Continued)

*Primary Examiner* — Haixia Du
(74) *Attorney, Agent, or Firm* — Oliff PLC

(57) ABSTRACT

A transmission type head mounted display which allows a user to visually recognize a display screen as a virtual image and to visually recognize the display screen at a focal length matching a convergence angle of the user, includes an image analysis portion that recognizes a real object within a view field of the user, a distance sensor that detects a distance from the user to the real object, a display control portion that displays the display screen in which an AR image for the real object is disposed, and a display section that displays the display screen, in which the display control portion displays a screen effect which guides a convergence angle of the user to a convergence angle matching the detected distance, on the display screen.

14 Claims, 12 Drawing Sheets

(51) Int. Cl.
  *G02B 27/01* (2006.01)
  *G06F 3/0481* (2013.01)
  *G06F 3/0482* (2013.01)
(52) U.S. Cl.
  CPC ........ *G06F 3/0482* (2013.01); *G06F 3/04817* (2013.01); *G02B 2027/014* (2013.01)
(58) Field of Classification Search
  CPC .......... H04N 21/4316; H04N 21/4728; H04N 13/0242; H04N 13/026; G06T 15/10; G06T 2200/16; G06T 19/006; G09G 3/003; G09G 2340/10; G02B 27/22
  See application file for complete search history.

(56) References Cited

U.S. PATENT DOCUMENTS

| | | | |
|---|---|---|---|
| 6,005,579 | A | 12/1999 | Sugiyama et al. |
| 6,043,818 | A | 3/2000 | Nakano et al. |
| 6,600,461 | B1 * | 7/2003 | Okauchi .............. G02B 27/017 345/8 |
| 9,041,740 | B2 | 5/2015 | Sugiyama et al. |
| 2006/0146125 | A1 | 7/2006 | Yamada |
| 2007/0132662 | A1 | 6/2007 | Morita |
| 2009/0150775 | A1 | 6/2009 | Miyazaki et al. |
| 2011/0032492 | A1 * | 2/2011 | Nara .................... H04N 9/3185 353/70 |
| 2011/0083103 | A1 | 4/2011 | Shim et al. |
| 2012/0069055 | A1 * | 3/2012 | Otsuki .................... G06F 3/017 345/681 |
| 2012/0200592 | A1 | 8/2012 | Kimura |
| 2012/0218303 | A1 | 8/2012 | Nakada |
| 2012/0235900 | A1 | 9/2012 | Border et al. |
| 2012/0306940 | A1 | 12/2012 | Machida et al. |
| 2013/0176335 | A1 | 7/2013 | Sugiyama et al. |
| 2013/0249945 | A1 | 9/2013 | Kobayashi |
| 2015/0035727 | A1 | 2/2015 | Kobayashi |
| 2015/0035728 | A1 | 2/2015 | Kobayashi |
| 2016/0018658 | A1 | 1/2016 | Machida et al. |
| 2016/0321970 | A1 | 11/2016 | Kobayashi |
| 2017/0003852 | A1 | 1/2017 | Miyazaki et al. |

FOREIGN PATENT DOCUMENTS

| | | |
|---|---|---|
| JP | 2005-084569 A | 3/2005 |
| JP | 2005-339267 A | 12/2005 |
| JP | 2005-343351 A | 12/2005 |
| JP | 2005-346177 A | 12/2005 |
| JP | 2007-296889 A | 11/2007 |
| JP | 2009-087368 A | 4/2009 |
| JP | 2009-157908 A | 7/2009 |
| JP | 2009-227245 A | 10/2009 |
| JP | 2010-098567 A | 4/2010 |
| JP | 4984771 B2 | 7/2012 |
| JP | 2012-163637 A | 8/2012 |
| JP | 2012-252091 A | 12/2012 |
| WO | 2013-052855 A2 | 4/2013 |

OTHER PUBLICATIONS

Patterson, Robert. "Human Factors of 3-D Displays". Journal of the Society for Information Display, vol. 15/11, pp. 861-871, 2007.
Nov. 17, 2015 Office Action issued in U.S. Appl. No. 14/328,065.
Apr. 13, 2016 Notice of Allowance issued in U.S. Appl. No. 14/328,065.
Sep. 6, 2016 Notice of Allowance issued in U.S. Appl. No. 15/208,992.
Aug. 28, 2015 Office Action issued in U.S. Appl. No. 14/329,104.
Jan. 15, 2016 Office Action issued in U.S. Appl. No. 14/329,104.
Sep. 9, 2016 Office Action issued in U.S. Appl. No. 14/329,104.

* cited by examiner

[Fig. 1]
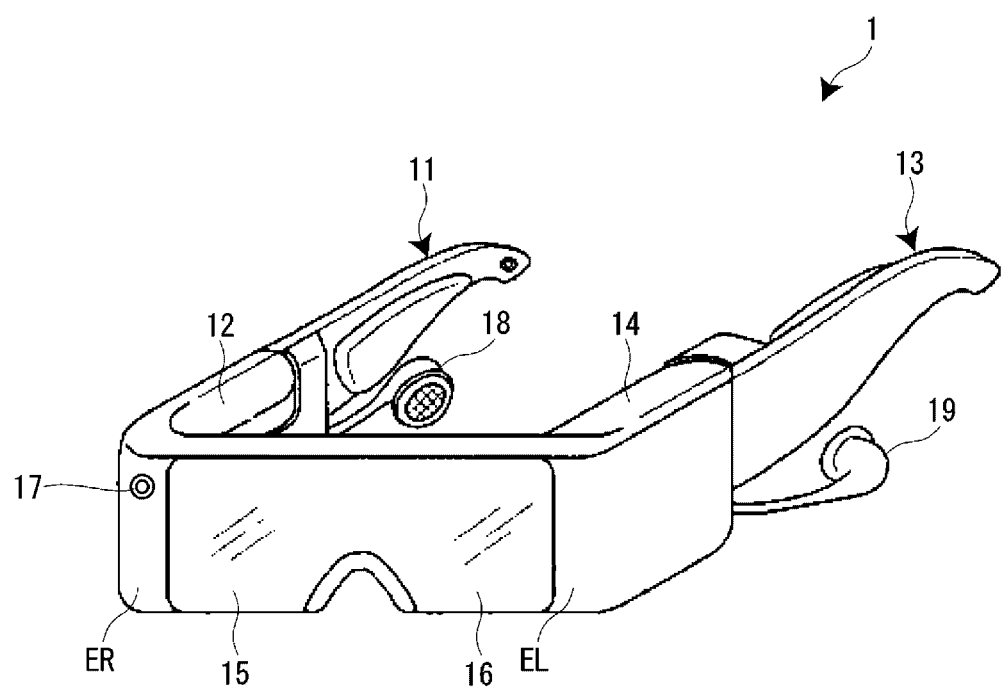

[Fig. 2]
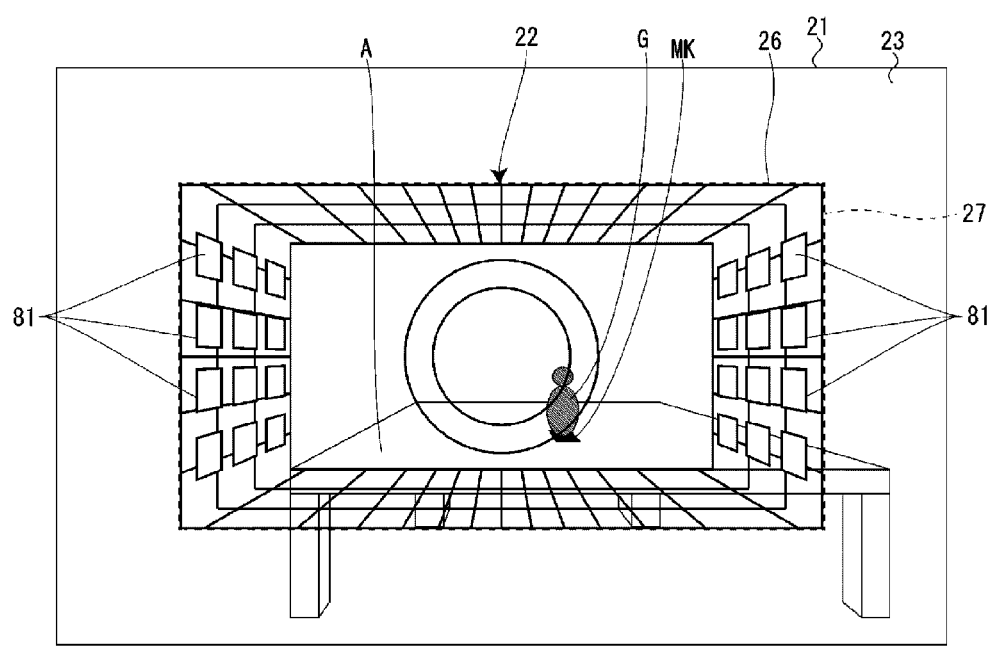

[Fig. 3]
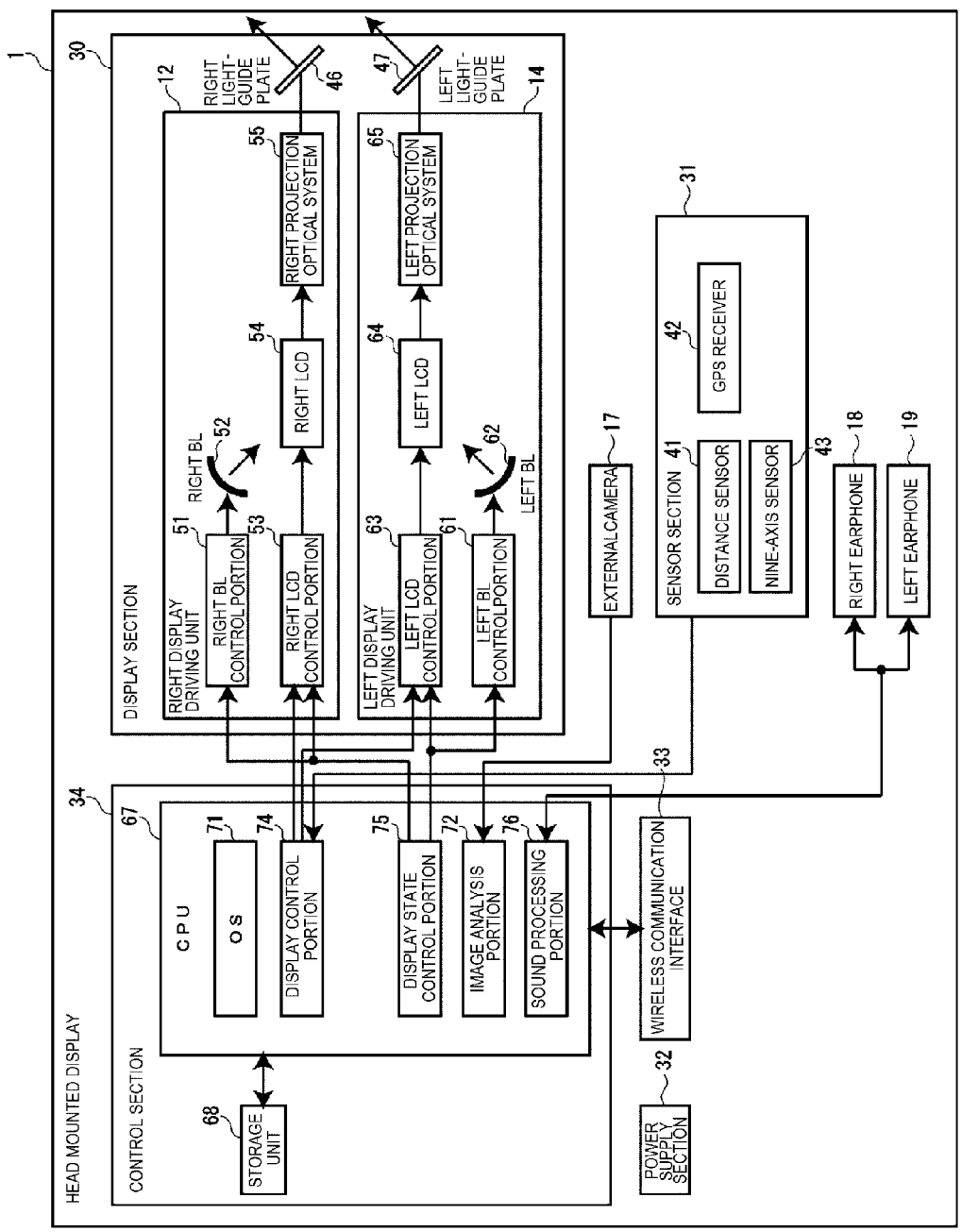

[Fig. 4]
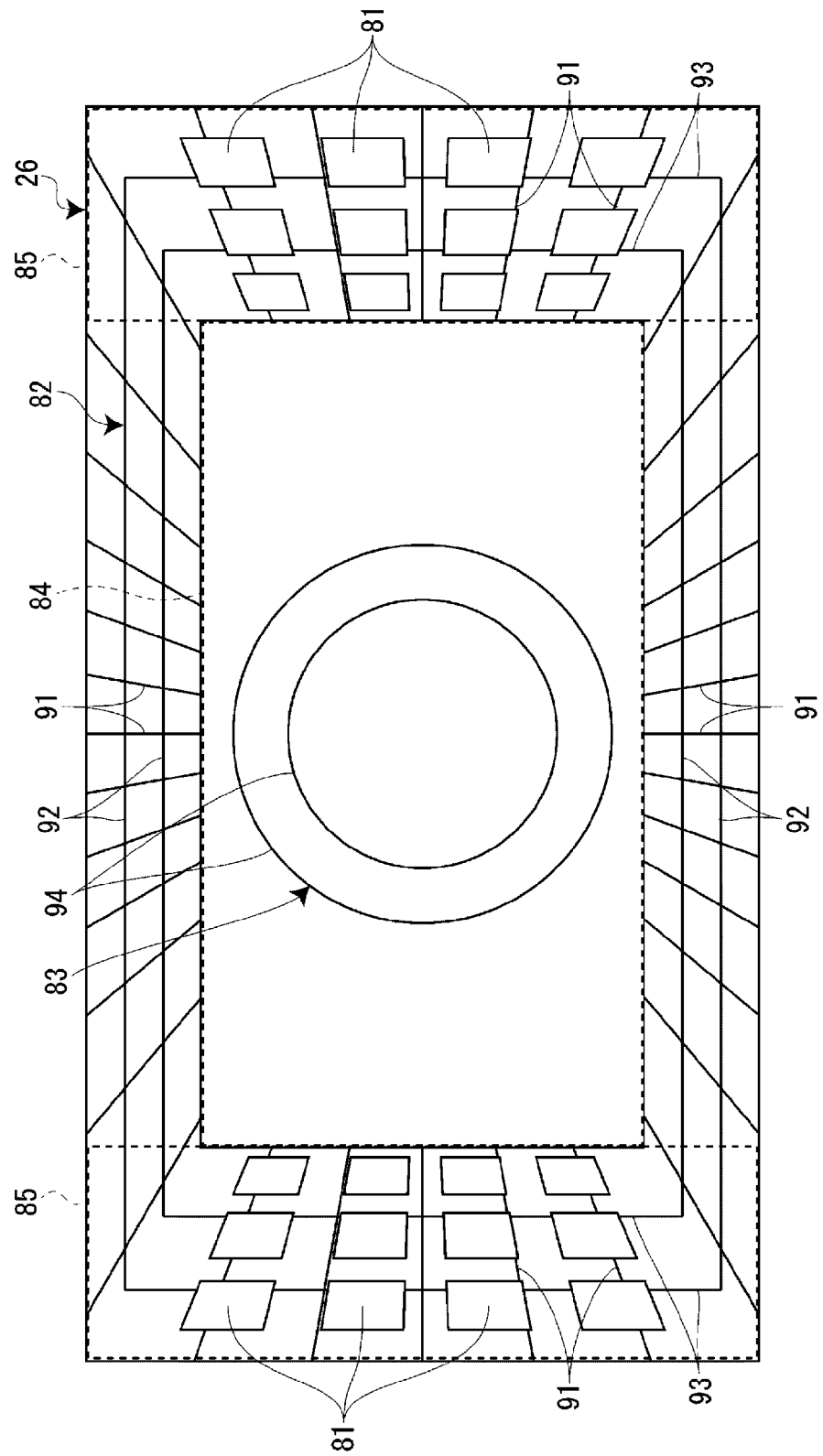

[Fig. 5]
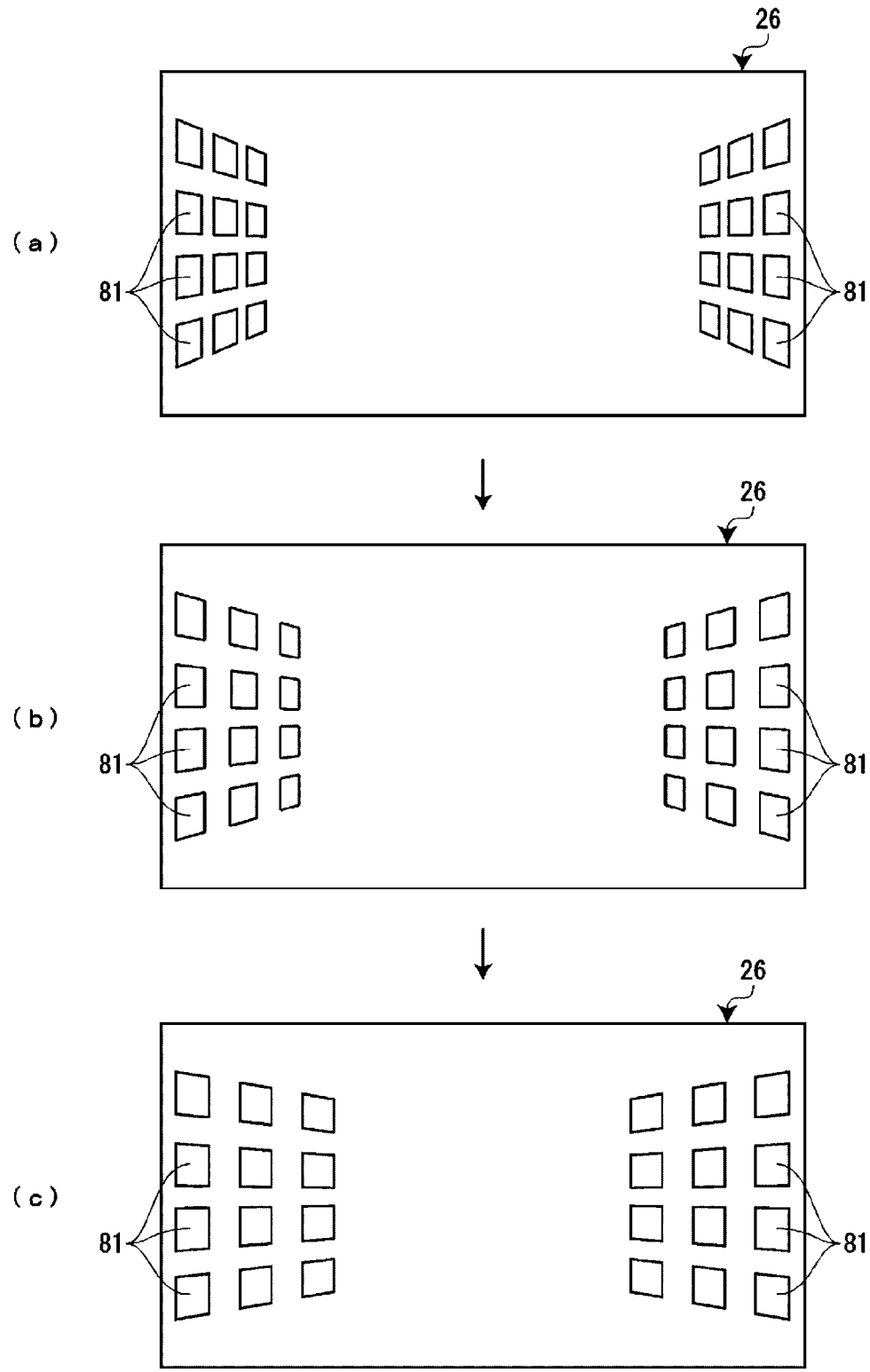

[Fig. 6]
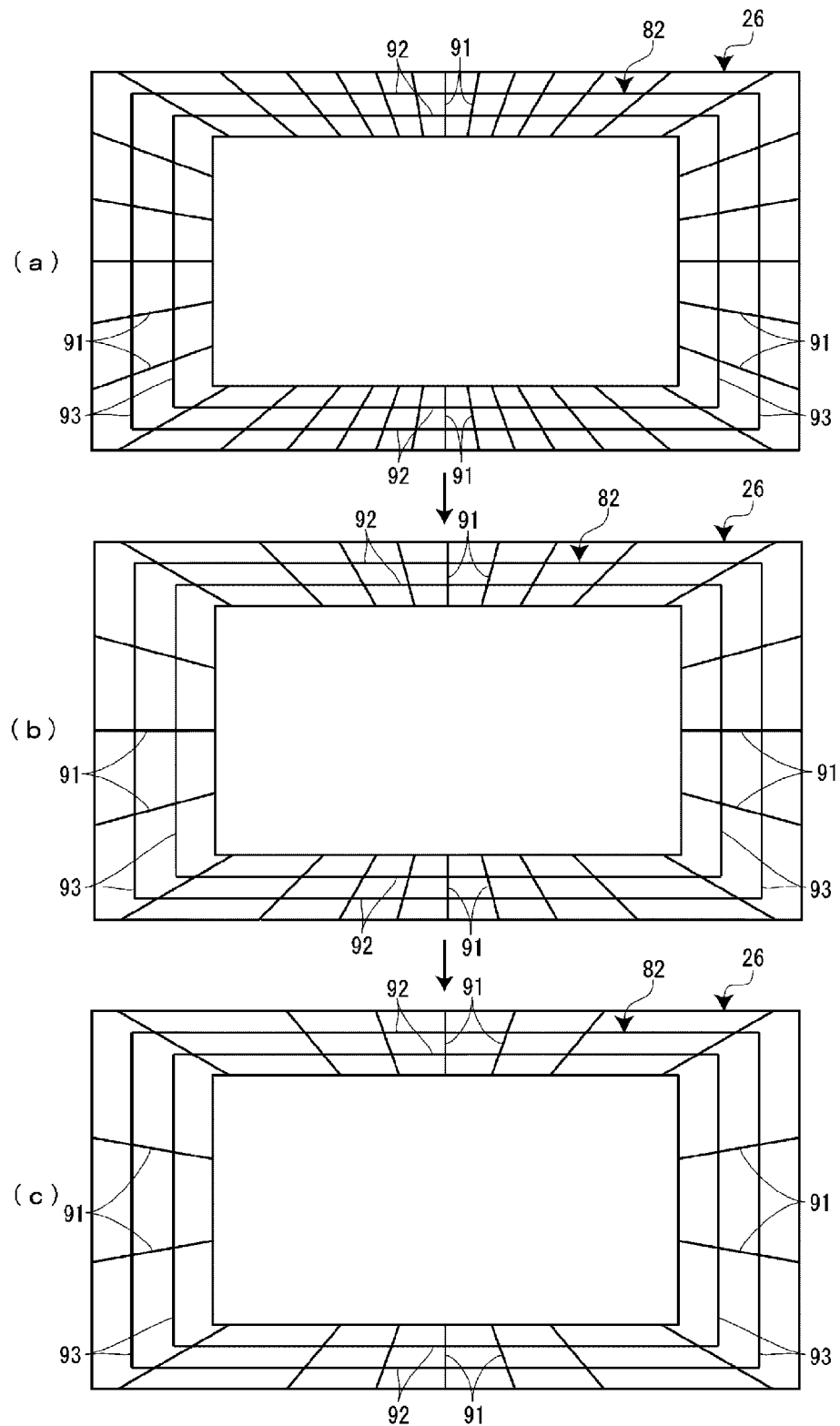

[Fig. 7]
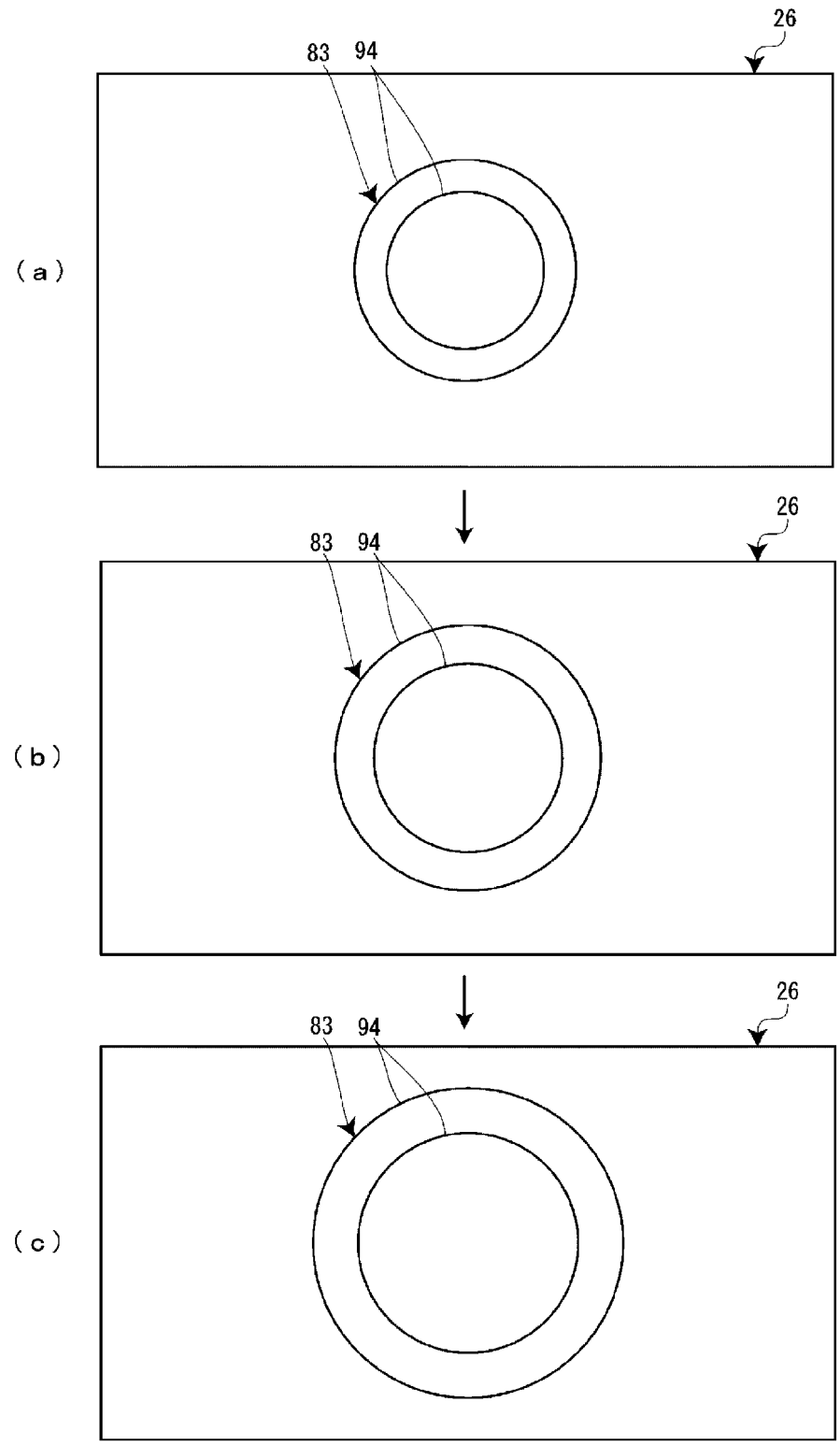

[Fig. 8]
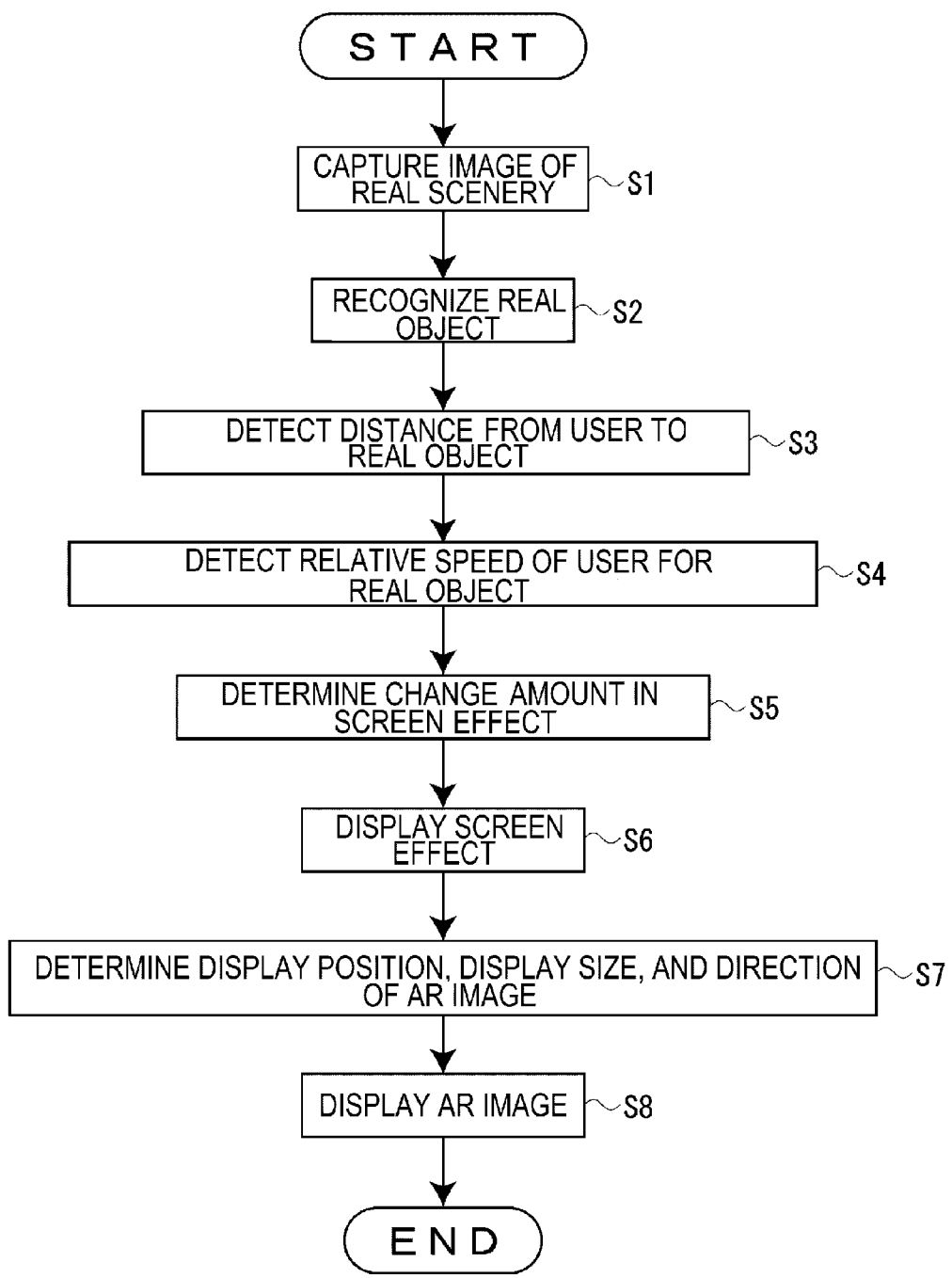

[Fig. 9]
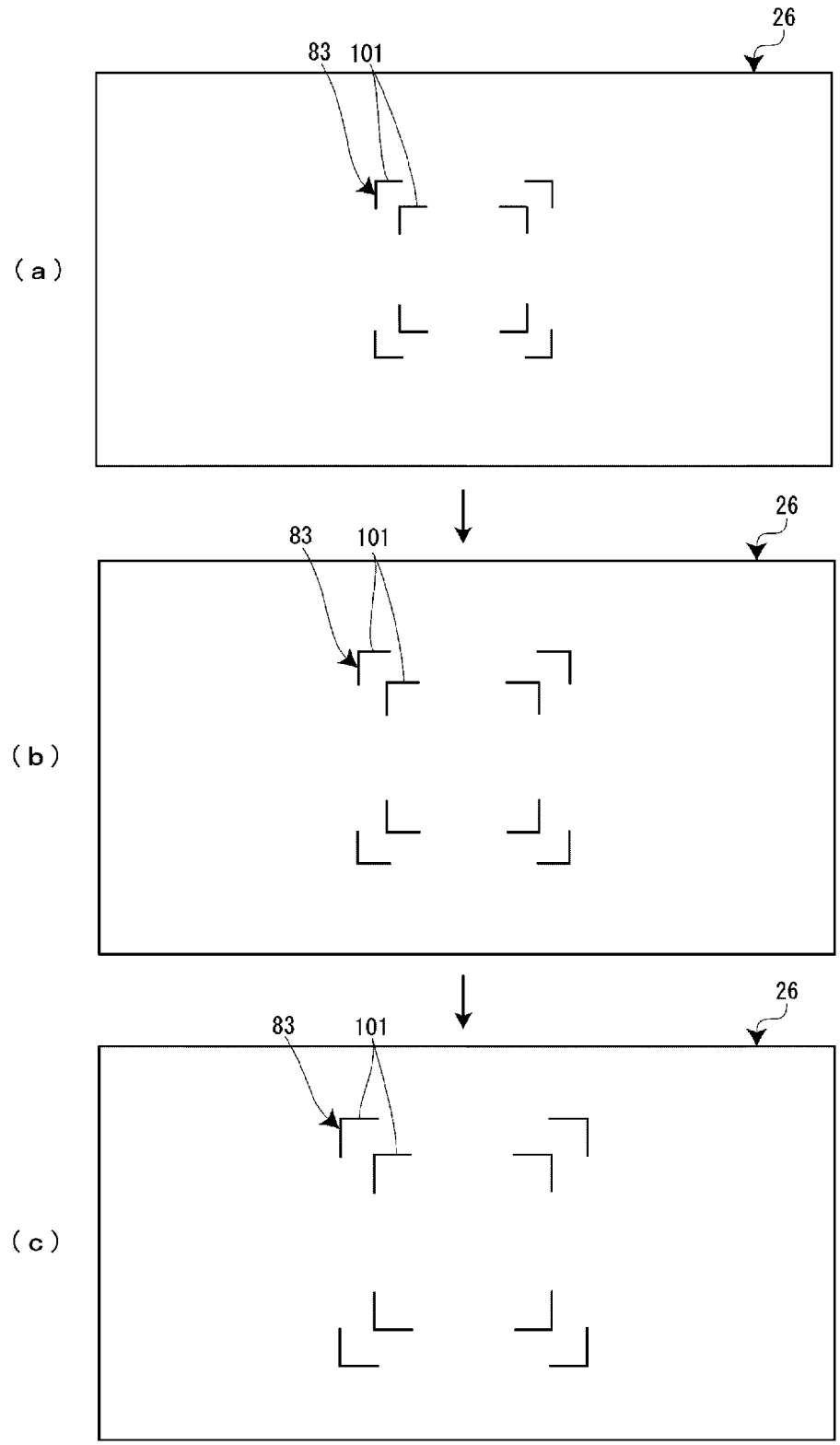

[Fig. 10]
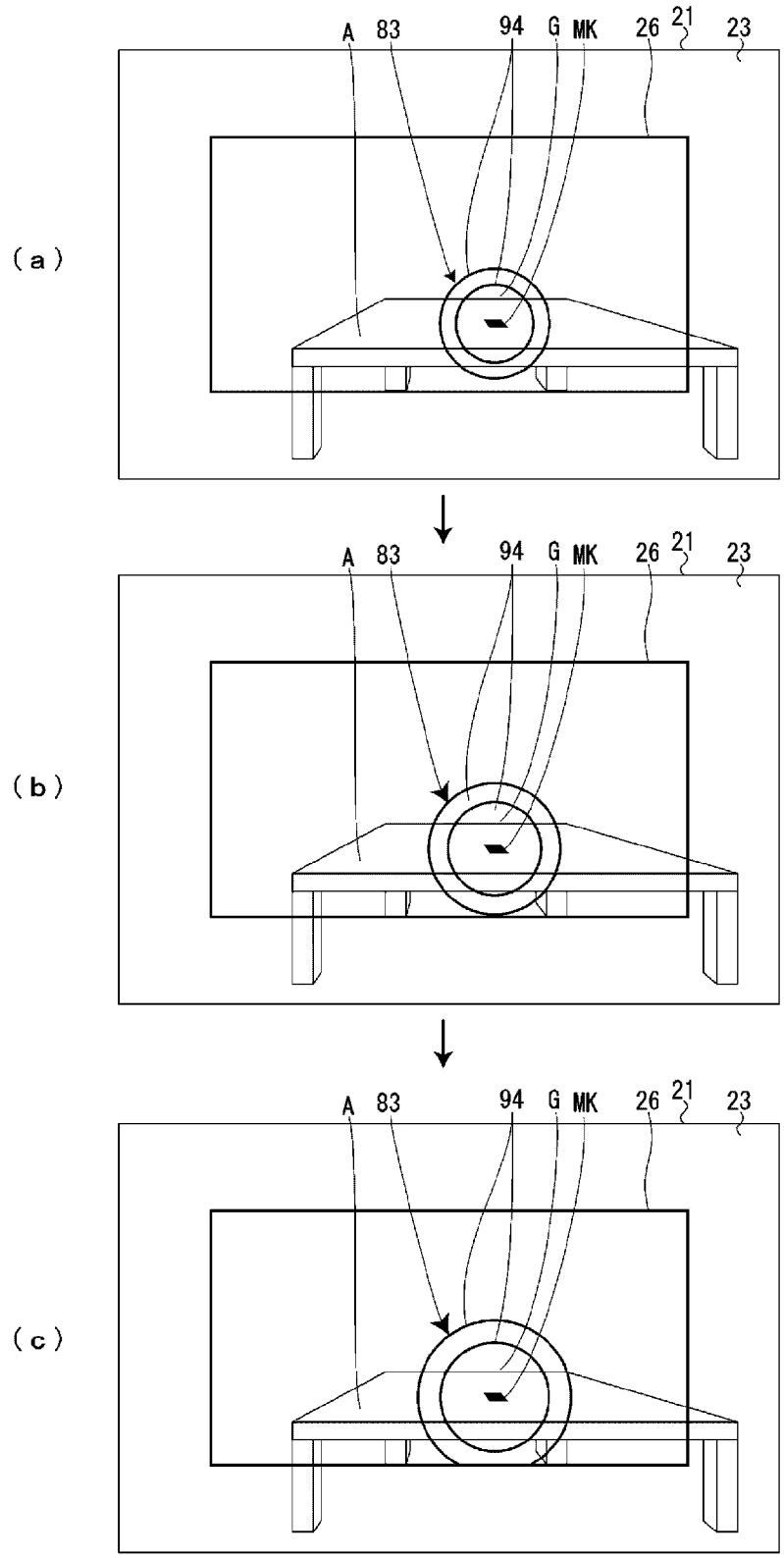

[Fig. 11]
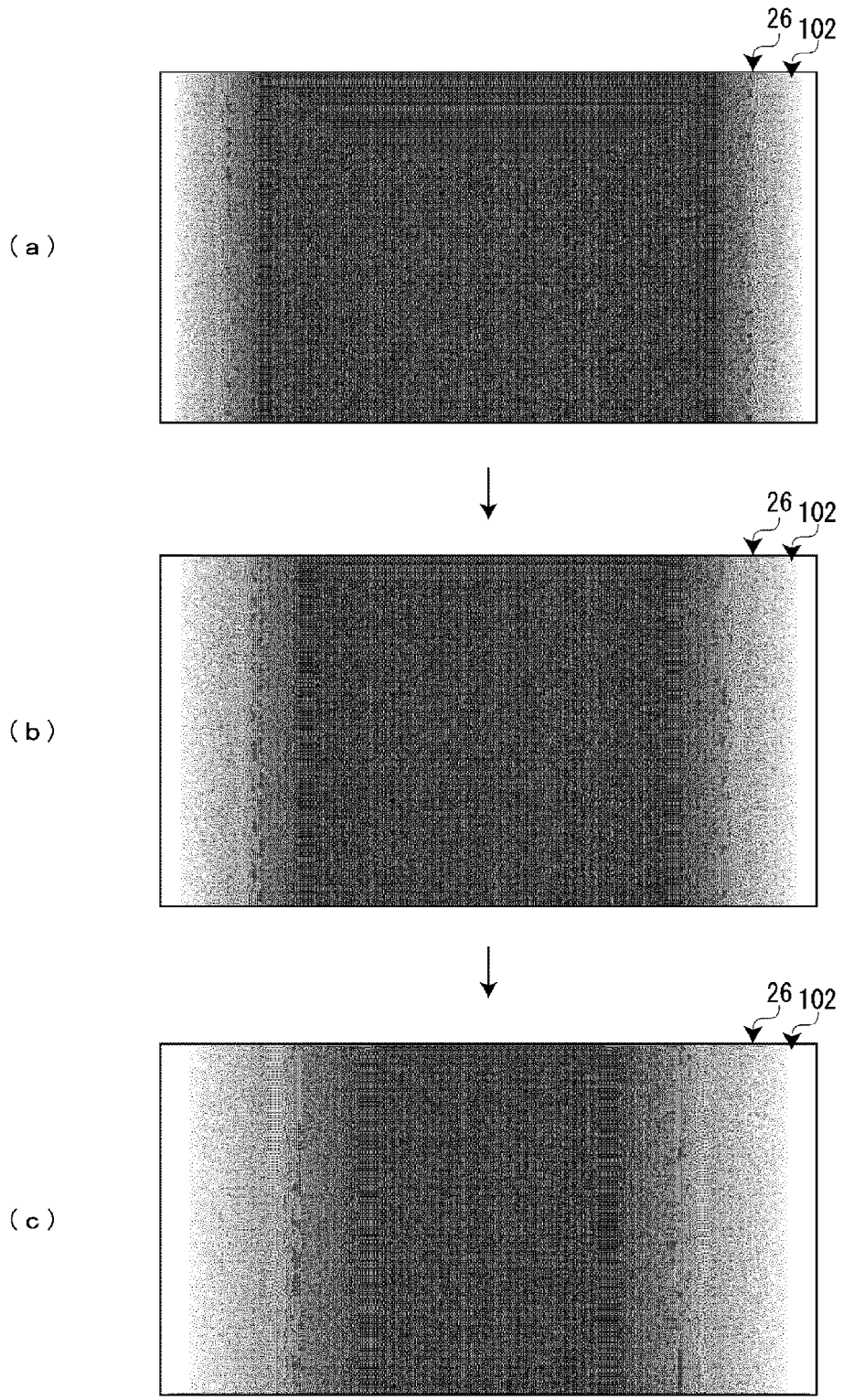
(a)
(b)
(c)

[Fig. 12]
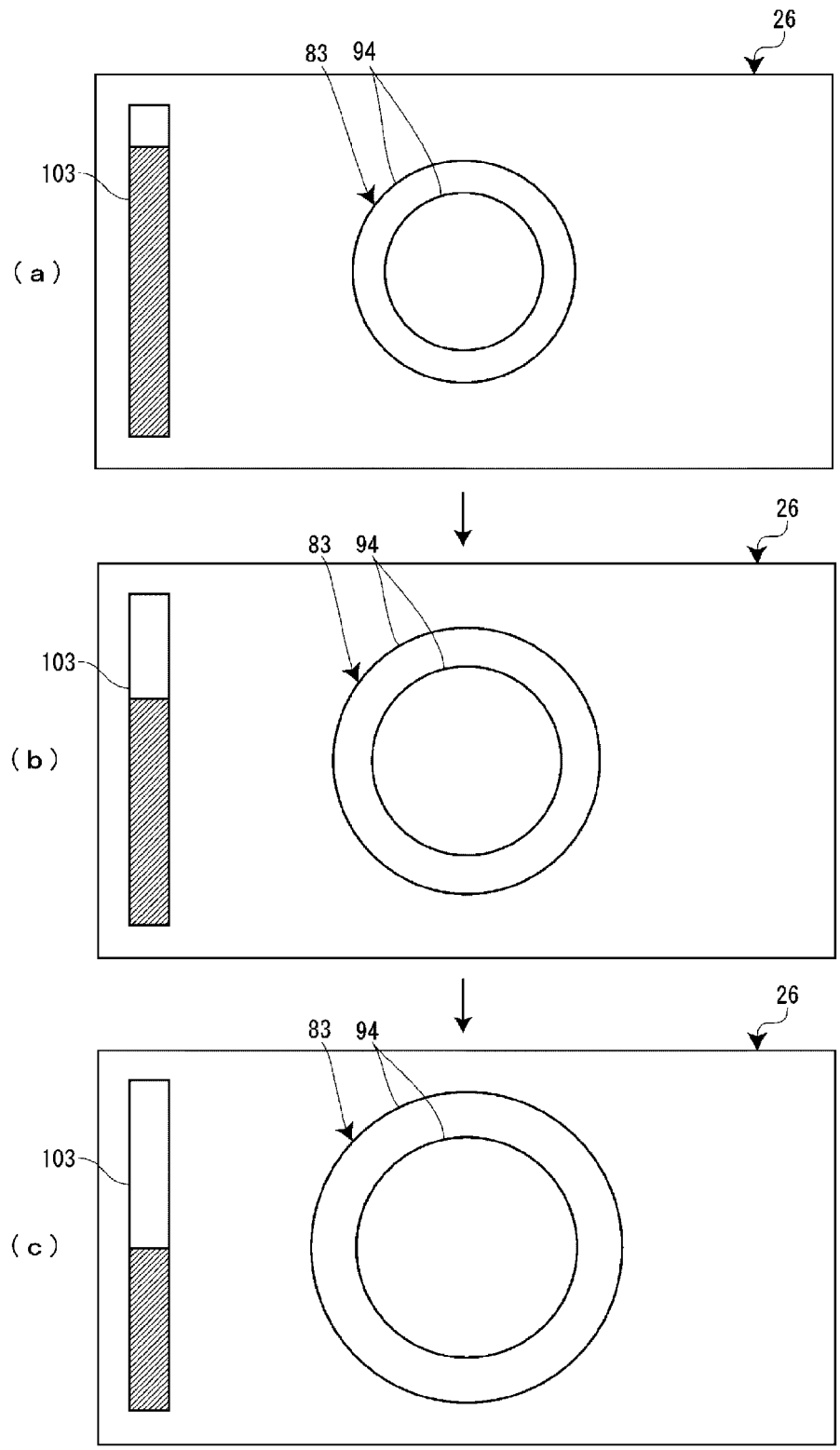

DISPLAY DEVICE, HEAD MOUNTED DISPLAY, DISPLAY SYSTEM, AND CONTROL METHOD FOR DISPLAY DEVICE

TECHNICAL FIELD

The present invention relates to a transmission type display device which allows a user to visually recognize a display screen as a virtual image, a head mounted display, a display system, and a control method for the display device.

BACKGROUND ART

In the related art, for this kind of transmission type display device, an optical transmission type head mounted display which is mounted on the head of a user is known (refer to PTL 1). In this display device, the user can visually recognize an image as a virtual image and can also directly visually recognize real scenery (external scenery).

CITATION LIST

Patent Literature

PTL 1: JP-A-2012-163637

SUMMARY OF INVENTION

Technical Problem

Meanwhile, an augmented reality (AR) system may be applied to such a transmission type display device. In other words, a real object within a view field of a user is recognized, and an augmented reality image is displayed so as to be added to the real object within the view field (real scenery). For example, an augmented reality image is displayed as if the image is placed on a surface of the real object. According to this configuration, since the AR image overlaps the visually recognized real object, it is possible to obtain a higher sense of reality than in a general AR system which combines a captured image with an image object.

However, if the AR system is just applied to such a transmission type display device, the following problems occur. In other words, in such a transmission type display device, an image is visually recognized at a focal length matching a convergence angle of a user. For this reason, there is a problem in that a focal length of an AR image deviates from a position of a real object, and thus the AR image is recognized to be separated from the real object. Therefore, the AR image is not recognized to be added to the real object (for example, so as to be placed thereon), and an affinity between the real space and the virtual space is considerably reduced. Particularly, a convergence angle of a user is usually a convergence angle matching infinity, and thus a focal length of the AR image is infinite. For this reason, the closer to the user the real object is, the more separated from the real object the AR image is recognized to be.

Solution to Problem

An advantage of some aspects of the invention is to provide a display device, a head mounted display, a display system, and a control method for the display device, capable of causing an augmented reality image to be recognized so as to be added to a real object, with a simple configuration.

An aspect of the invention is directed to a transmission type display device which allows a user to visually recognize a display screen as a virtual image and to visually recognize the display screen at a focal length matching a convergence angle of the user, the display device including an object recognition section that recognizes a real object within a view field of the user; a distance detection section that detects a distance from the user to the real object; a display control section that displays the display screen in which an augmented reality image for the real object is disposed; and a display section that displays the display screen, in which the display control section displays an image for guiding a visual line of the user to a convergence angle matching the detected distance, on the display screen.

Another aspect of the invention is directed to a transmission type head mounted display which is mounted on the head of a user, and allows the user to visually recognize a display screen as a virtual image and to visually recognize the display screen at a focal length matching a convergence angle of the user, the head mounted display including an object recognition section that recognizes a real object within a view field of the user; a distance detection section that detects a distance from the user to the real object; a display control section that displays the display screen in which an augmented reality image for the real object is disposed; and a display section that displays the display screen, in which the display control section displays an image for guiding a visual line of the user to a convergence angle matching the detected distance, on the display screen.

Still another aspect of the invention is directed to a transmission type display system which allows a user to visually recognize a display screen as a virtual image and to visually recognize the display screen at a focal length matching a convergence angle of the user, the display system including an object recognition section that recognizes a real object within a view field of the user; a distance detection section that detects a distance from the user to the real object; a display control section that displays the display screen in which an augmented reality image for the real object is disposed; and a display section that displays the display screen, in which the display control section displays an image for guiding a visual line of the user to a convergence angle matching the detected distance, on the display screen.

Yet another aspect of the invention is directed to a control method for a transmission type display device which allows a user to visually recognize a display screen as a virtual image and to visually recognize the display screen at a focal length matching a convergence angle of the user, the method including an object recognition step of recognizing a real object within a view field of the user; a distance detection step of detecting a distance from the user to the real object; a display control step of displaying the display screen in which an augmented reality image for the real object is disposed; and a display step of displaying the display screen, in which, in the display control step, an image for guiding a visual line of the user to a convergence angle matching the detected distance is displayed on the display screen.

According to the configurations, a convergence angle of the user can be made to match a position of the real object by guiding a visual line (a convergence angle: an extent of being crossed-eyed) of the user to a convergence angle matching a detected distance to the real object due to the image, and thus a focal length (focal point) of the augmented reality image can be made to match the position of the real object. In other words, it is possible to adjust the focal length of the augmented reality image just by displaying a specific image (screen effect) (just by controlling the display), and thus the augmented reality image can be recognized so as to be added to the real object with a simple configuration. Therefore, the augmented reality image can be displayed so as to be added to the real object, and thus it is possible to improve affinity between the real space and the virtual space. In addition, the display of the image is preferably performed prior to display of the augmented reality image. Further, the image may be a still image, and may be a moving image.

In the display device described above, it is preferable that the display control section displays a plurality of image objects which are used to call respective applications and are converted into inward perspective images by using perspective, on the display screen, and gradually changes an extent of an inward tilt of the plurality of image objects as the image.

In this case, it is preferable that the plurality of image objects are any one of icons, menus, and reduced application screens.

According to the configurations, an extent of an inward tilt in the plurality of image objects is changed. In other words, the plurality of image objects are changed as if gate doors of the image objects are opened and closed. A convergence angle of the user is changed due to this change. As mentioned above, an extent of an inward tilt of the plurality of image objects is changed so that a convergence angle of the user can be guided by using the image objects for calling respective application.

It is preferable that the display control section displays a guide in which a plurality of guide lines extending from outer edge sides of the display screen toward a central side thereof are disposed in a circumferential direction, on the display screen, and gradually changes a pitch of the guide lines in the circumferential direction in the guide as the image.

According to the configuration, a pitch of the guide lines in the circumferential direction is gradually changed so that the perspective caused by perspective illusion which occurs due to the plurality of guide lines is gradually changed. A convergence angle of the user is changed due to the change of the perspective. As mentioned above, it is possible to effectively guide a convergence angle of the user by changing a pitch of the plurality of guide lines.

It is preferable that the display control section displays one of a frame-shaped image surrounding the center of the display screen and a ring-shaped image surrounding the center of the display screen, on the display screen, and gradually changes a size of the one image as the image.

It is preferable that the display control section displays one of a frame-shaped image centering on the real object and a ring-shaped image centering on the real object, on the display screen, and gradually changes a size of the one image as the image.

According to the configurations, a size of the frame-shaped image or the ring-shaped image is gradually changed so that the user has an illusion that the frame-shaped image or the ring-shaped image is gradually moved in a forward direction in a depth. A convergence angle of the user is changed due to this illusion. As mentioned above, a size of the frame-shaped image or the ring-shaped image is gradually changed, and thus it is possible to effectively guide a convergence angle of the user.

It is preferable that the display control section displays a gradation image which is darkened from the outer edge sides of the display screen toward the central side thereof, on the display screen, and gradually changes an extent of variations in light and shade in the gradation image as the image.

According to the configuration, the perspective caused by perspective illusion which occurs due to the gradation image having light and shade is gradually changed. A convergence angle of the user is changed due to the change of the perspective. As mentioned above, it is possible to effectively guide a convergence angle of the user by changing an extent of variations in light and shade of the gradation image.

It is preferable that the display device further includes a speed detection section that detects a relative movement speed of the user for the real object, in which the display control section adjusts the image on the basis of a detection result from the speed detection section.

According to the configuration, since the image is adjusted on the basis of a relative movement speed of the user for the real object, matching of a focal length of the augmented reality image with a position of the real object can be performed with high accuracy.

It is preferable that the display control section displays an indicator indicating a convergence angle of the user on the display screen.

According to the configuration, the user can check a convergence angle of the user by confirming the indicator.

It is preferable that the display section includes an image light output unit that outputs image light; and a lightguide unit that guides the output image light to the eyes of the user, and the lightguide unit transmits external light therethrough, and makes the external light incident to the eyes of the user along with the image light.

According to the configuration, a so-called virtual image projection type display device is used, and thus it is possible to provide an inexpensive transmission type display device with a simple configuration.

BRIEF DESCRIPTION OF DRAWINGS

FIG. 1 is an explanatory view illustrating an exterior configuration of a head mounted display according to an embodiment.

FIG. 2 is a diagram illustrating an example of a virtual image and real scenery which can be visually recognized by a user.

FIG. 3 is a block diagram illustrating a control configuration of the head mounted display.

FIG. 4 is a diagram illustrating a display screen.

FIG. 5 is a screen transition diagram illustrating a screen effect using a plurality of icons.

FIG. 6 is a screen transition diagram illustrating a screen effect using a perspective guide.

FIG. 7 is a screen transition diagram illustrating a screen effect using a target.

FIG. 8 is a flowchart illustrating a display operation of an AR image performed by the head mounted display.

FIG. 9 is a screen transition diagram illustrating Modification Example 1 of a screen effect using a target.

FIG. 10 is a screen transition diagram illustrating Modification Example 2 of a screen effect using a target.

FIG. 11 is a screen transition diagram illustrating a screen effect using a gradation image.

FIG. 12 is a screen transition diagram illustrating an indicator.

DESCRIPTION OF EMBODIMENTS

Hereinafter, with reference to the accompanying drawings, a description will be made of a display device, a head mounted display, a display system, and a control method for the display device according to an embodiment of the invention. In the present embodiment, a head mounted display to which a display device according to the invention is applied is exemplified. The head mounted display (HMD) is a display device which is mounted on the head of a user. The head mounted display of the present embodiment is an optical transmission type head mounted display (a transmission type head mounted display, or a see-through type head mounted display) which allows the user to visually recognize an image as a virtual image and to directly visually recognize real scenery (external scenery), and has a glasses shape (a goggle shape).

As illustrated in FIG. 1, a head mounted display 1 includes a right holding unit 11, a right display driving unit 12, a left holding unit 13, a left display driving unit 14, a right optical image display unit 15, a left optical image display unit 16, an external camera 17, a right earphone 18 for the right ear, and a left earphone 19 for the left ear.

The right optical image display unit 15 and the left optical image display unit 16 are respectively disposed so as to be located in front of the right and left eyes of the user when the user wears the head mounted display 1. One end of the right optical image display unit 15 and one end of the left optical image display unit 16 are connected to each other at the position corresponding to the glabella of the user when the user wears the head mounted display 1. The right holding unit 11 extends from an end part ER which is the other end of the right optical image display unit 15. Similarly, the left holding unit 13 extends from an end part EL which is the other end of the left optical image display unit 16.

The right holding unit 11 is a member which is provided so as to extend over a position corresponding to the temporal region of the user from the end part ER of the right optical image display unit 15 when the user wears the head mounted display 1 and so as to be substantially perpendicular to the right optical image display unit 15. Similarly, the left holding unit 13 is a member which is provided so as to extend over a position corresponding to the temporal region of the user from the end part EL of the left optical image display unit 16 when the user wears the head mounted display 1 and so as to be substantially perpendicular to the left optical image display unit 16. The right holding unit 11 and the left holding unit 13 hold the head mounted display 1 on the head of the user in the same manner as temples of glasses.

The right display driving unit 12 is disposed inside the right holding unit 11, that is, on a side opposing the head of the user when the user wears the head mounted display 1 and on the end part ER side of the right optical image display unit 15. In addition, the left display driving unit 14 is disposed inside the left holding unit 13 and on the end part EL side of the left optical image display unit 16.

The external camera 17 captures an image of the real scenery 23 in a view field direction of the user (in front of the user) in a state of wearing the head mounted display 1. Although details thereof will be described later, an image captured by the external camera 17 is used to recognize a marker MK provided at a real object A, and further recognize the real object A.

The right earphone 18 and the left earphone 19 are respectively mounted on the right ear and the left ear when the user wears the head mounted display 1, and output various sounds to the right and left ears.

Next, with reference to FIG. 2, a description will be made of an example of a virtual image 22 and the real scenery 23 which can be visually recognized by the user wearing the head mounted display 1. As illustrated in FIG. 2, a display screen 26 generated by the head mounted display 1 is displayed as the virtual image 22 in a view field 21 of the user wearing the head mounted display 1. The display screen 26 is displayed in an entire virtual image display region 27 where the virtual image 22 is displayed (the virtual image 22 can be displayed). In addition, the user can view the real scenery 23 through the right optical image display unit 15 and the left optical image display unit 16 in the view field 21 of the user. In the example of FIG. 2, a table which is the real object A is viewed as the real scenery 23. In other words, the user can visually recognize the virtual image 22 and the real scenery 23 altogether within the view field 21. In the present embodiment, the virtual image 22 (the display screen 26) is visually recognized at a focal length matching a convergence angle of the user.

Next, with reference to FIG. 3, a control configuration of the head mounted display 1 will be described. As illustrated in FIG. 3, the head mounted display 1 includes a display section 30 which allows the user to visually recognize the virtual image 22, the external camera 17, the right earphone 18, the left earphone 19, a sensor section 31, a power supply section 32, a wireless communication interface 33, and a control section 34 which controls the above-described constituent elements.

The sensor section 31 detects various information related to control of the head mounted display 1. Specifically, the sensor section 31 includes a distance sensor (distance detection unit) 41, a GPS receiver 42, and a nine-axis sensor 43. The distance sensor 41 detects a distance from the user (more accurately, the head mounted display 1) to the real object A (more accurately, the marker MK), for example, in an optical method or an ultrasonic method. The GPS receiver 42 acquires positional information indicating a position of the user (more accurately, the head mounted display 1) by receiving a GPS signal. The nine-axis sensor 43 detects three-axis acceleration, three-axis angular velocity, and three-axis geomagnetism.

The power supply section 32 supplies power to the respective constituent elements of the head mounted display 1. The wireless communication interface 33 performs communication with an external server via a wireless network.

The display section 30 includes the right display driving unit (image light output unit) 12, the left display driving unit (image light output unit) 14, a right lightguide plate (lightguide unit) 46 which is the right optical image display unit 15, and a left lightguide plate (lightguide unit) 47 which is the left optical image display unit 16.

The right display driving unit 12 includes a right backlight (BL) control portion 51 and a right backlight (BL) 52 which function as a light source, a right liquid crystal display (LCD) control portion 53 and a right LCD 54 which function as a display element, and a right projection optical system 55.

The right backlight control portion 51 controls driving of the right backlight 52 on the basis of an input control signal. The right backlight 52 is, for example, a light emitting body such as a light emitting diode (LED) or an electroluminescence (EL) element. The right LCD control portion 53 controls driving of the right LCD 54 on the basis of input display data. The right LCD 54 is a transmission type liquid crystal panel in which a plurality of pixels are arranged in a matrix.

The right projection optical system 55 projects (outputs) image light which is emitted from the right LCD 54, and is formed by using, for example, a collimator lens. The right lightguide plate 46 as the right optical image display unit 15 is made of a light transmissive resin material and reflects image light output from the right projection optical system 55 along a predetermined light path, so as to guide the image light to the right eye of the user. In addition, the right lightguide plate 46 transmits external light (light of the real scenery 23) therethrough, and makes the external light incident to the eye of the user along with the image light.

In the same manner as the right display driving unit 12, the left display driving unit 14 includes a left backlight (BL) control portion 61, a left backlight (BL) 62, a left LCD control portion 63, a left LCD 64, and a left projection optical system 65. A configuration or a function of each constituent element included in the left display driving unit 14 is the same as that of each constituent element included in the right display driving unit 12, and description thereof will not be repeated here. In addition, the left lightguide plate 47 as the left optical image display unit 16 is made of a light transmissive resin material and reflects image light output from the left projection optical system 65 along a predetermined light path, so as to guide the image light to the left eye of the user. In addition, the left lightguide plate 47 transmits external light therethrough, and makes the external light incident to the eye of the user along with the image light.

As described above, the image light which is guided to both eyes of the user of the head mounted display 1 forms an image on the retinae of the user, and thus the user visually recognizes the virtual image 22 (the display screen 26) in the virtual image display region 27, for example, as illustrated in FIG. 2. In other words, the present head mounted display 1 has a configuration of a virtual image projection type head mounted display. In the present head mounted display 1, the virtual image 22 is visually recognized by the user at a focal length matching a convergence angle of the user. In addition, here, forming an image on the retinae with the image light is referred to as "display".

The control section 34 includes a central processing unit (CPU) 67 and a storage unit 68. The storage unit 68 is constituted by a read only memory (ROM), a random access memory (RAM), and the like, and stores various computer programs. The CPU 67 reads and executes the computer programs from the storage unit 68 so as to function as an operating system (OS) 71, an image analysis portion (object recognition portion) 72, a display control portion 74, a display state control portion 75, and a sound processing portion 76.

The image analysis portion 72 acquires an image signal of an image captured by the external camera 17, and analyzes the acquired image signal. The image analysis portion 72 recognizes the marker MK for recognizing an object provided at the real object A through the image analysis, and recognizes the real object A provided with the marker MK (refer to FIG. 2 in relation to the marker MK and the real object A). Accordingly, the real object A within the view field 21 of the user is recognized. In addition, the present embodiment has a configuration in which the marker MK is provided at the real object A, and the real object A is recognized by recognizing the marker, but may have a configuration in which feature positions (feature points) of the real object A are recognized without using the marker so that the real object A is recognized. In addition, there may be a configuration in which positional information of the marker MK in the real space is detected on the basis of positional information of the user obtained from the GPS receiver 42 and the nine-axis sensor 43, a direction of the head of the user obtained from the nine-axis sensor 43, and a position of the marker MK within the view field 21 obtained by the image analysis portion 72, and the real object A is recognized on the basis of the detected positional information. In this case, there may be a configuration in which correspondence data between the positional information of the marker MK and the real object A is stored in the head mounted display 1 in advance, and there may be a configuration in which information on the corresponding real object A is stored in an external server, and is acquired from the external server by the wireless communication interface 33 each time positional information of the marker MK is detected.

The display control portion 74 generates display data, and transmits the display data to the display section 30 (the right LCD control portion 53 and the left LCD control portion 63). The display control portion 74 generates display data of the display screen 26, and transmits the display data to the display section 30 so that the display screen 26 is displayed on the display section 30. In other words, in the present head mounted display 1, the display data of the display screen 26 is generated and is transmitted to the display section 30 by the display control portion 74 (display control step), and the display screen 26 is displayed (an image is formed on the retinae by the image light) by the display section 30 on the basis of the transmitted display data (display step).

In addition, the display control portion 74 displays an AR image (augmented reality image) G for the recognized real object A on the display screen 26 according to an AR application. Specifically, the display control portion 74 disposes and displays the AR image G for the real object A on the display screen 26 so that the AR image is added to the real object A (for example, so that the AR image is placed thereon), on the basis of the recognition result of the real object A from the image analysis portion 72 (refer to FIG. 2). In other words, the display control portion 74 determines a display position, a display size, and a direction of the AR image G so that the AR image is visually recognized to be added to the real object A, and disposes and displays the AR image G on the display screen on the basis of them. In addition, as for the AR image G for the real object A, each AR image G corresponding to each real object A may be stored in the storage unit 68, and each AR image G corresponding to each real object A may be acquired from an external server by the wireless communication interface 33. Further, the display control portion 74 displays the AR image G by adding a relative movement speed of the user for the real object A thereto in addition to the recognition result of the real object A from the image analysis portion 72. In other words, a relative movement speed of the user for the real object A is detected by the distance sensor 41 and the nine-axis sensor 43 (speed detection portion), a display position, a display size, and a direction of the AR image G on the display screen 26 are determined on the basis of the detection result and the recognition result of the real object A, and the AR image G is disposed and displayed on the basis of them.

As described later in detail, the display control portion 74 displays a screen effect which guides a convergence angle of the user to a convergence angle matching a distance from the user to the real object A, prior to the display of the AR image G.

The display state control portion 75 generates control signals for controlling the right display driving unit 12 and the left display driving unit 14, and transmits the control signals to the display section 30 so as to control an image display state in the display section 30. Specifically, by using the control signals, the display state control portion 75 individually controls the right LCD control portion 53 to turn on and off driving of the right LCD 54, the right backlight control portion 51 to turn on and off driving of the right backlight 52, the left LCD control portion 63 to turn on and off driving of the left LCD 64, and the left backlight control portion 61 to turn on and off driving of the left backlight 62. Therefore, generation and emission of image light by the right display driving unit 12 and the left display driving unit 14 are controlled.

The sound processing portion 76 transmits audio signals to the right earphone 18 and the left earphone 19 so that the right earphone 18 and the left earphone 19 output sounds.

Next, the display screen 26 of the head mounted display 1 will be described with reference to FIG. 4. The display screen 26 is a screen in which icons 81 for calling respective applications are disposed, and is, for example, a home screen. In an example of FIG. 4, the display screen 26 on which the AR image G is not displayed is illustrated. As illustrated in FIG. 4, the display screen 26 includes a plurality of icons (image objects) 81 which are disposed on the left and right of the display screen 26, a perspective guide (guide) 82 which is formed on the entire display screen 26 except for the center, and a double ring-shaped target 83 disposed at the center of the display screen 26. In addition, a view field securing region 84 for viewing the real scenery 23 is set in the center of the display screen 26 in advance. Further, a background of the display screen 26 is totally transmitted.

The plurality of icons 81 are disposed only in retreating regions 85 which retreat to the left and right sides of the view field securing region 84 so as to avoid the view field securing region 84. The plurality of icons 81 are divided into two parts in the left and right retreating regions 85, and are disposed in both of the retreating regions 85. In addition, as each of the icons 81, an image is disposed in which a rectangular icon image is converted into a perspective image by using a perspective. Specifically, an image is disposed in which a rectangular icon image is converted into a perspective image which has the center of the display screen 26 as a vanishing point and is directed toward the inside of the view field securing region 84 (a view field securing region 84 side direction). In other words, a perspective rectangular icon image is disposed. Accordingly, rectangular icon images of the plurality of icons 81 are displayed so as to be attached to the left and right walls in perspective when viewed by the user. Further, the plurality of icons 81 include icons 81 for calling AR applications.

The perspective guide 82 includes a plurality of first guide lines 91 corresponding to vanishing lines which have the center of the display screen 26 as a vanishing point, a plurality of second guide lines 92 corresponding to horizontal lines, and a plurality of third guide lines 93 corresponding to vertical lines. The plurality of first guide lines 91 are disposed so as to be arranged in a circumferential direction, and extend from the outer edge side of the display screen 26 to the central side thereof. Specifically, the plurality of first guide lines 91 avoid the view field securing region 84 and extend from the outer edge of the display screen 26 to the front side of the view field securing region 84. In addition, "guide lines" recited in the appended claims are formed by the first guide lines 91.

The plurality of second guide lines 92 extend in the horizontal direction, and avoid the view field securing region 84 and are disposed at upper and lower end parts of the display screen 26. On the other hand, the plurality of third guide lines 93 extend in the vertical direction, and avoid the view field securing region 84 and are disposed at left and right end parts of the display screen 26. Therefore, in the upper and lower end parts of the display screen 26, the first guide lines 91 and the second guide lines 92 have forms of a top wall and a bottom wall in perspective. On the other hand, in the left and right end parts of the display screen 26, the first guide lines 91 and the third guide lines 93 have forms of a left wall and a right wall in perspective. In other words, the first guide lines 91, the second guide lines 92, and the third guide lines 93 have a room shape (box shape) without front and rear walls in perspective.

The target 83 is formed by two ring-shaped images 94 surrounding the center of the display screen 26. The two ring-shaped images 94 have different diameters and are formed in a concentric shape having the center of the display screen 26 as a central point.

Here, a description will be made of display of a screen effect performed by the display control portion 74. As described above, the display control portion 74 displays a screen effect which guides a convergence angle (an extent of being crossed-eyed) of the user to a convergence angle matching a distance from the user to the real object A, prior to display of the AR image G. Specifically, as the screen effect, shapes of the images (the plurality of icons 81, the perspective guide 82, and the target 83) on the display screen 26 are gradually changed so that a convergence angle (each visual line of both eyes) of the user is guided. In the present embodiment, a convergence angle of the user is assumed to match infinity in a default state before a screen effect is displayed, an adjustment amount of a convergence angle which is required to match the distance is obtained by using the infinity as a reference, and a change amount of shapes of the images is determined on the basis of the obtained adjustment amount of a convergence angle. In addition, the determination of the change amount for the adjustment amount of a convergence angle is performed on the basis of a data table of each adjustment amount for each change amount, obtained by experiment in advance.

In addition, in the present embodiment, the display control portion 74 adjusts a screen effect on the basis of a relative movement speed of the user for the real object A. In other words, the display control portion 74 detects a relative movement speed of the user for the real object A by using the distance sensor 41 and the nine-axis sensor 43, and determines the change amount on the basis of a distance from the user to the real object A and the movement speed. That is, if the user moves, a variation occurs between the detected distance and the actual distance when the screen effect is displayed due to time lag between when the distance is detected and when the screen effect is displayed. In the present embodiment, the change amount is corrected in consideration of the variation.

Next, with reference to FIGS. 5 and 6, a description will be made of each of screen effects using the plurality of icons 81, the perspective guide 82, and the target 83. FIG. 5 is a screen transition diagram illustrating a screen effect using the plurality of icons 81. As illustrated in FIG. 5, the display control portion 74 gradually changes an extent of an inward tilt of the plurality of icons 81 in perspective as a screen effect. In other words, the plurality of icons 81 are gradually changed as if gate doors of the icons are opened and closed. That is, the gate doors are gradually closed by the determined change amount. Accordingly, the user may have an illusion that the plurality of icons 81 come forward such that the user is made to be crossed-eyed, and thus a convergence angle of the user is increased.

FIG. 6 is a screen transition diagram illustrating a screen effect using the perspective guide 82. As illustrated in FIG. 6, the display control portion 74 gradually changes a pitch of the first guide lines 91 in the circumferential direction in the perspective guide 82 as a screen effect. In other words, a pitch of the first guide lines 91 in the circumferential direction is gradually increased by a determined change amount. Accordingly, the perspective caused by perspective illusion which occurs due to the plurality of first guide lines 91 is gradually changed such that the user is made to be crossed-eyed, and thus a convergence angle of the user is increased.

FIG. 7 is a screen transition diagram illustrating a screen effect using the target 83. As illustrated in FIG. 7, the display control portion 74 gradually changes sizes of the two ring-shaped images 94 in the target 83 as a screen effect. In other words, the two ring-shaped images 94 are gradually enlarged by a determined change amount. Accordingly, the user may have an illusion that the two ring-shaped images 94 are gradually moved forward such that the user is made to be crossed-eyed, and thus a convergence angle of the user is increased.

In addition, although, in FIGS. 5 to 7, each screen effect is separately illustrated, and only each image used for the screen effect is illustrated, the display control portion 74 may display all the screen effects and may display only one of the screen effects prior to display of the AR image G.

Next, with reference to FIG. 8, a description will be made of a display operation of the AR image G performed by the head mounted display 1. In addition, the display operation is performed in a state in which the display screen 26 is displayed, and is performed by a controller (not illustrated) according to an AR application by clicking on the icon 81 of the AR application.

As illustrated in FIG. 8, first, the head mounted display 1 captures an image of the real scenery 23 by using the external camera 17 (S1). In addition, the marker MK in the captured image obtained by the external camera 17 is recognized by the image analysis portion 72, so that the real object A is recognized (S2: object recognition step).

If the real object A is recognized, a distance from the user to the recognized real object A is detected by the distance sensor 41 (S3: distance detection step), and a relative movement speed of the user for the recognized real object A is detected by the distance sensor 41 and the nine-axis sensor 43 (S4).

Next, a change amount in a screen effect is determined by the display control portion 74 on the basis of the detected distance from the user to the real object A and the detected movement speed (S5). In addition, the screen effect is displayed on the basis of the change amount (S6).

When the display of the screen effect is finished, a display position, a display size, and a direction of the AR image G are determined by the display control portion 74 so that the AR image G is added to the real object A, on the basis of the recognition result of the real object A from the image analysis portion 72 and the detected movement speed (S7). In addition, the AR image G is displayed on the basis of the determined display position, display size and direction (S8). Therefore, the display operation ends.

According to the above-described configuration, a convergence angle of the user can be made to match a position of the real object A by guiding the convergence angle (an extent of being crossed-eyed) of the user to a convergence angle matching a detected distance to the real object A due to the screen effect, and thus a focal length (focal point) of the AR image G can be made to match the position of the real object A. In other words, it is possible to adjust the focal length of the AR image G just by displaying a specific screen effect (just by controlling the display), and thus the AR image G can be recognized so as to be added to the real object A with a simple configuration. Therefore, the AR image G can be displayed so as to be added to the real object A, and thus it is possible to improve affinity between the real space and the virtual space.

In addition, an extent of an inward tilt of the plurality of icons 81 is changed as a screen effect, and thus it is possible to guide a convergence angle of the user by using the icons 81.

Further, a pitch of the first guide lines 91 in the circumferential direction in the perspective guide 82 is changed as a screen effect, and thus it is possible to effectively guide a convergence angle of the user.

Furthermore, sizes of the ring-shaped images 94 are gradually changed as a screen effect, and thus it is possible to effectively guide a convergence angle of the user.

Moreover, since a relative movement speed of the user for the real object A is detected, and a screen effect is adjusted on the basis of the relative movement speed, matching of a focal length of the AR image G with a position of the real object A can be performed with high accuracy.

In addition, although, in the present embodiment, the target 83 is formed by the two ring-shaped images 94, and sizes of the two ring-shaped images 94 are changed as a screen effect, as illustrated in FIG. 9, the target 83 may be formed by two frame-shaped images 101 surrounding the center of the display screen 26, and sizes of the two frame-shaped images 101 may be changed as a screen effect. Further, the target 83 may be formed by a single ring-shaped image 94 or a single frame-shaped image 101.

Furthermore, although, in the present embodiment, the ring-shaped images 94 or the frame-shaped images 101 surrounding the center of the display screen 26 are displayed, and sizes of the ring-shaped images 94 or the frame-shaped images 101 are changed as a screen effect, as illustrated in FIG. 10, the ring-shaped images 94 or the frame-shaped images 101 centering on the recognized real object A may be displayed, and sizes of the ring-shaped images 94 or the frame-shaped images 101 may be changed as a screen effect.

Moreover, in the present embodiment, a gradation image may be used to execute a screen effect. In other words, as illustrated in FIG. 11, the display control portion 74 displays a gradation image 102 which is darkened from the outer edge sides of the display screen 26 toward the central side, on the display screen 26, and gradually changes an extent of variation in light and shade in the gradation image 102. That is, the user is made to recognize the gradation image 102 as if there were walls on the left and right, and an extent of variation in light and shade is gradually changed by a determined change amount. Accordingly, the user may have an illusion that the walls come toward the front side such that the user is made to be crossed-eyed, and thus a convergence angle of the user is increased. According to this configuration, it is possible to effectively guide a convergence angle of the user by using the gradation image 102.

In addition, although, in the present embodiment, a convergence angle of the user is assumed to match infinity in a default state before a screen effect is displayed, and a convergence angle is guided by using the infinity as a reference, a convergence angle of the user may be detected, and guidance to a convergence angle may be performed by using the detected convergence angle as a reference. Specifically, the head mounted display 1 further includes a visual line detection sensor (for example, an infrared type) which detects a visual line of each eyeball of the user, and the CPU 67 functions as a convergence angle detection portion which detects a convergence angle of the user on the basis of a detection result from the visual line detection sensor. Further, the display control portion 74 obtains an adjustment amount of a convergence angle which is required to match the detected distance on the basis of a detection result from the convergence angle detection portion by using the detection result as a reference, and determines a change amount of a screen effect on the basis of the adjustment amount. Furthermore, shapes of the images are changed by the determined change amount. Moreover, in a case where guidance for reducing a convergence angle is necessary, the screen transition illustrated in the figures is performed in a reverse order (an order of FIGS. 11C, 11B, and 11A).

In addition, in the present embodiment, as illustrated in FIG. 12, when a screen effect is displayed, an indicator 103 indicating a convergence angle of the user may also be displayed. According to this configuration, the user can check a convergence angle of the user by visually recognizing the indicator 103.

Further, although, in the present embodiment, the real object A is recognized on the basis of the marker MK or feature positions of the real object A, in a case where the real object A is a display object such as a signage or a signboard which displays a character string, the real object A may be recognized by recognizing a displayed character string.

Furthermore, although, in the present embodiment, the images (the plurality of icons 81, the perspective guide 82, and the target 83) used for screen effects are displayed before an AR application is activated (before the AR image G is instructed to be displayed), the images may be displayed after the AR application is activated, and screen effects may be displayed.

Moreover, although, in the present embodiment, a screen effect is displayed before the AR image G is displayed, a screen effect may be displayed after the AR image G is displayed.

In addition, although, in the present embodiment, the plurality of icons 81 are displayed on the display screen 26, the invention is not limited thereto as long as an image object for calling each application is displayed on the display screen 26. For example, a menu indicating each application or a reduced application screen may be displayed as the image object on the display screen 26.

Further, a plurality of image objects (for example, the icons 81 or shortcuts) for calling respective files or folders may be displayed on the display screen 26 instead of a plurality of image objects for calling respective applications, and image objects (for example, a radio button, a selection button, a software keyboard, and the like) for performing respective user operations may be displayed on the display screen 26 instead of a plurality of image objects for calling respective applications.

Furthermore, in the present embodiment, the head mounted display 1 includes a controller (not illustrated), and some or all of the image analysis portion 72, the display control portion 74, the display state control portion 75, and the sound processing portion 76 may be mounted in the controller. In this case, the controller may be connected to the control section 34, the display section 30, or the like (the display section 30, the external camera 17, the sensor section 31, the right earphone 18, and the left earphone 19) in a wired manner via a cord or the like, and may be connected to the control section 34, the display section 30, or the like in a wireless manner through a wireless LAN, infrared communication, Bluetooth (registered trademark), or the like. Moreover, a function of the controller may be realized by a personal computer (PC), a portable information terminal (a PDA, a mobile phone, a watch type portable terminal, or a smart phone), or the like.

In addition, although, in the present embodiment, a binocular type head mounted display 1 (an optical transmission type head mounted display) is exemplified as a display device, the invention is also applicable to head mounted displays of other types such as a monocular type. Further, although, in the present embodiment, the head mounted display 1 of a type of covering the front side of the eyes is exemplified, the invention is not limited thereto, and is also applicable to a head mounted display of a type of not completely covering the front side of the eyes (a type of covering a part of the front side of the eyes). Furthermore, the invention is not limited to a head mounted display, and is also applicable to other display devices such as a head-up display.

Moreover, although, in the present embodiment, the image light output unit includes the backlight control portions (the right backlight control portion 51 and the left backlight control portion 61), the backlights (the right backlight 52 and the left backlight 62), the LCD control portions (the right LCD control portion 53 and the left LCD control portion 63), and the LCDs (the right LCD 54 and the left LCD 64), this aspect is only an example. The image light output unit may include constituent elements for realizing other types along with the above-described constituent elements or instead of the above-described constituent elements.

For example, the image light output unit may include an organic electroluminescent (EL) display and an organic EL control portion. In addition, the image light output unit may include, for example, LCoS (liquid crystal on silicon; LCoS is a registered trademark) or a digital micromirror device instead of an LCD.

Further, although, in the present embodiment, the invention is applied to the so-called virtual image projection type head mounted display 1, the invention is also applicable to a laser retinal projection type (a so-called retinal scanning type) head mounted display.

Furthermore, although, in the present embodiment, the image light output unit includes the projection optical systems (the right projection optical system 55 and the left projection optical system 65), and projects image light which is emitted from the LCDs, the image light output unit may include, for example, a scanning optical system formed by a MEMS mirror, and a signal light modulation portion (signal light generation portion) which emits signal light to the scanning optical system instead of the projection optical systems. In this case, the signal light which is generated and emitted by the signal light modulation portion is incident to the scanning optical system (MEMS mirror) which is a scanning portion. The scanning optical system emits the signal light as scanning light toward a conductive body having a half mirror layer, and the scanning light is scanned on a surface of the half mirror layer so that a virtual image is formed by the image light. A user can perceive the virtual image with the eyes and thus can recognize an image.

In addition, although, in the present embodiment, the invention is applied to the head mounted display 1, the invention may be applied to a display system in which the head mounted display 1 is connected to an external apparatus or an external server via a network. In this case, some or all of the image analysis portion 72, the display control portion 74, the display state control portion 75, and the sound processing portion 76 are mounted in the external apparatus side or the external server side.

REFERENCE SIGNS LIST

1: Head mounted display
22: Virtual image

26: Display screen
30: Display section
41: Distance sensor
72: Image analysis portion
74: Display control portion
81: Icon
82: Perspective guide
91: First guide line
94: Ring-shaped image
A: Real object
G: AR image

The invention claimed is:

1. A transmission type display device which allows a user to visually recognize a display screen as a virtual image and to visually recognize the display screen at a focal length matching a convergence angle of the user, the display device comprising:
 a processor that recognizes a real object within a view field of the user;
 a first sensor that detects a distance from the user to the real object;
 the processor controlling the display device to display the display screen in which an augmented reality image for the real object is disposed; and
 a display that displays the display screen,
 wherein the processor controls the display device to display an image surrounding and centered on the real object, on the display screen, and to gradually change a size of the surrounding and centered image for guiding a visual line of the user to a convergence angle matching the detected distance, on the display screen.

2. The display device according to claim 1, wherein the processor controls the display screen to display a plurality of image objects which are used to call respective applications and are converted into inward perspective images by using perspective, on the display screen, and gradually changes an extent of an inward tilt of the plurality of image objects as the image.

3. The display device according to claim 2, wherein the plurality of image objects are any one of icons, menus, and reduced application screens.

4. The display device according to claim 1, wherein the processor controls the display screen to display a guide in which a plurality of guide lines extending from outer edge sides of the display screen toward a central side thereof are disposed in a circumferential direction, on the display screen, and gradually changes a pitch of the guide lines in the circumferential direction in the guide as the image.

5. The display device according to claim 1, wherein the processor controls the display screen to display one of a frame-shaped image surrounding the center of the display screen and a ring-shaped image surrounding the center of the display screen, on the display screen, and gradually changes a size of the one image as the image.

6. The display device according to claim 1, wherein the processor controls the display screen to display one of a frame-shaped image centering on the real object and a ring-shaped image centering on the real object, on the display screen, and gradually changes a size of the one image as the image.

7. The display device according to claim 1, wherein the processor controls the display screen to display a gradation image which is darkened from the outer edge sides of the display screen toward the central side thereof, on the display screen, and gradually changes an extent of variations in light and shade in the gradation image as the image.

8. The display device according to claim 1, further comprising:
 a second sensor that detects a relative movement speed of the user for the real object,
 wherein the processor controls the display screen to adjust the image on the basis of a detection result from the second sensor.

9. The display device according to claim 1, wherein the processor controls the display screen to display an indicator indicating a convergence angle of the user on the display screen.

10. The display device according to claim 1, wherein the display includes:
 an image light output unit that outputs image light; and
 a lightguide plate that guides the output image light to the eyes of the user, and
 wherein the lightguide plate transmits external light therethrough, and makes the external light incident to the eyes of the user along with the image light.

11. The display device according to claim 1, wherein the processor controls the display device to display one of a frame-shaped image centering on the real object and a ring-shaped image centering on the real object, in a view field securing region of the display screen in which the real object is displayed, for guiding the visual line of the user to the convergence angle matching the detected distance, on the display screen.

12. A transmission type head mounted display which is mounted on the head of a user, and allows the user to visually recognize a display screen as a virtual image and to visually recognize the display screen at a focal length matching a convergence angle of the user, the head mounted display comprising:
 a processor that recognizes a real object within a view field of the user;
 a first sensor that detects a distance from the user to the real object;
 the processor controlling the display to display the display screen in which an augmented reality image for the real object is disposed; and
 a display that displays the display screen,
 wherein the processor controls the display screen to display an image surrounding and centered on the real object, on the display screen, and to gradually change a size of the surrounding and centered image for guiding a visual line of the user to a convergence angle matching the detected distance, on the display screen.

13. A transmission type display system which allows a user to visually recognize a display screen as a virtual image and to visually recognize the display screen at a focal length matching a convergence angle of the user, the display system comprising:
 a processor that recognizes a real object within a view field of the user;
 a first sensor that detects a distance from the user to the real object;
 the processor controlling the system to display the display screen in which an augmented reality image for the real object is disposed; and
 a display that displays the display screen,
 wherein the processor controls the display screen to display an image surrounding and centered on the real object, on the display screen, and to gradually change a size of the surrounding and centered image for guiding a visual line of the user to a convergence angle matching the detected distance, on the display screen.

14. A control method for a transmission type display device which allows a user to visually recognize a display screen as a virtual image and to visually recognize the display screen at a focal length matching a convergence angle of the user, the method comprising:
- an object recognition step of recognizing a real object within a view field of the user;
- a distance detection step of detecting a distance from the user to the real object;
- a display control step of displaying the display screen in which an augmented reality image for the real object is disposed; and
- a display step of displaying the display screen,
- wherein, in the display control step, an image surrounding and centered on the real object, on the display screen, is displayed, and a size of the surrounding and centered image is gradually changed, for guiding a visual line of the user to a convergence angle matching the detected distance on the display screen.

* * * * *